United States Patent [19]
Fletcher et al.

[11] 3,868,856
[45] Mar. 4, 1975

[54] INSTRUMENTATION FOR MEASUREMENT OF AIR-CRAFT NOISE AND SONIC BOOM

[76] Inventors: James C. Fletcher, Administrator of the National Aeronautics and Space Administration with respect to an invention of; Allan J. Zuckerwar, Youngstown, Ohio

[22] Filed: Apr. 25, 1973

[21] Appl. No.: 354,408

[52] U.S. Cl. .................................. 73/557, 332/2
[51] Int. Cl. ........................................ G01l 11/00
[58] Field of Search ............... 73/71.4, 555–558; 324/61 QS; 332/2, 16 T, 28; 179/1 N, 1SS; 340/261

[56] References Cited
UNITED STATES PATENTS

| | | | |
|---|---|---|---|
| 1,871,886 | 3/1932 | Inglis et al. ........................ | 73/558 |
| 1,994,232 | 3/1935 | Schuck, Jr. ........................ | 73/558 |
| 2,363,918 | 11/1944 | Wilcox et al. ..................... | 332/28 |
| 2,395,309 | 2/1946 | Wiener et al. ..................... | 73/557 |
| 2,441,504 | 5/1948 | O'Brien ............................. | 332/28 X |
| 3,621,471 | 11/1971 | Dick ................................... | 332/16 T |
| 3,728,642 | 4/1973 | Campman .......................... | 332/2 |

*Primary Examiner*—Charles A. Ruehl
*Attorney, Agent, or Firm*—William H. King; Howard J. Osborn; John R. Manning

[57] ABSTRACT

Instrumentation suitable for measuring aircraft noise and sonic booms. A converter produces an electric current proportional to the sound pressure level at a condenser microphone. The electric current is transmitted over a cable, amplified by a zero drive amplifier and recorded on a magnetic tape. The converter consists of a local oscillator, a dual-gate field-effect transistor (FET) mixer and a voltage regulator/impedance translator. The local oscillator generates a carrier voltage that is applied to one of the gates of the FET mixer. The FET mixer mixes the microphone signal with the carrier to produce an electrical current at the frequency of vibration of the microphone diaphragm. The voltage regulator/impedance translator regulates the voltage of the local oscillator and mixer stages, eliminates the carrier at the output and provides a low output impedance at the cable terminals.

6 Claims, 5 Drawing Figures

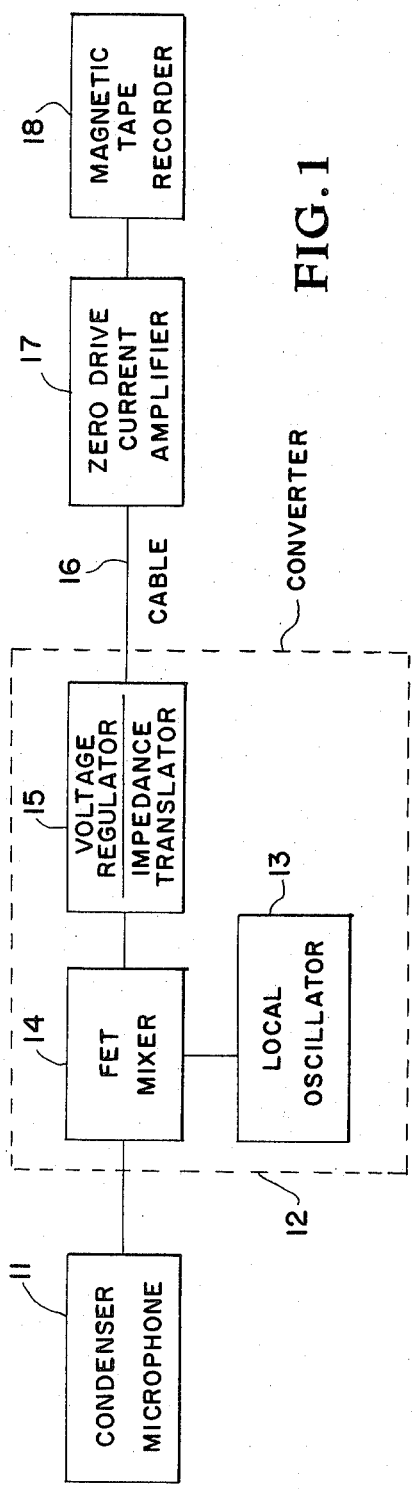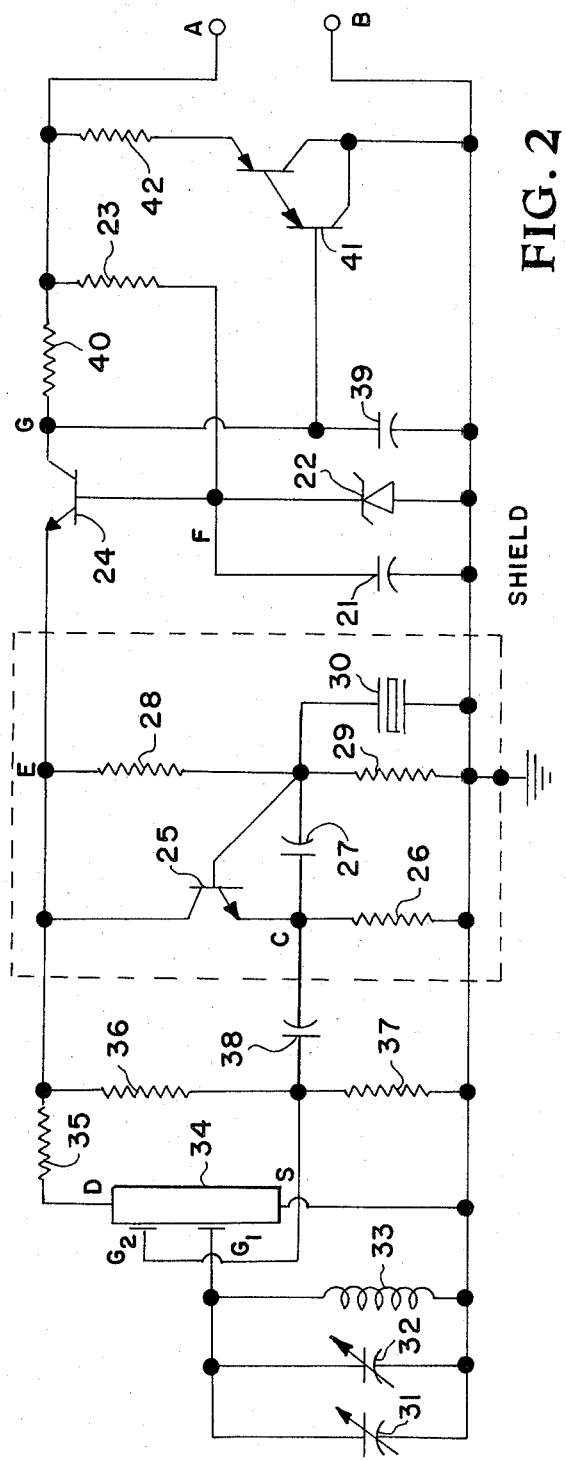

INSTRUMENTATION FOR MEASUREMENT OF AIR-CRAFT NOISE AND SONIC BOOM

ORIGIN OF THE INVENTION

The invention described herein was made in the performance of work under a NASA contract and is subject to the provisions of Section 305 of the National Aeronautics and Space Act of 1958, Public Law 85-568 (72 STAT 435; 42 USC 2457).

BACKGROUND OF THE INVENTION

The invention relates generally to the measurement of noise and more specifically concerns instrumentation for use in the measuring of aircraft noise and sonic boom.

In the past, systems for measuring aircraft noise and sonic boom usually subject the condenser microphone to the aircraft noise or sonic boom and then measure the small changes in capacitance that occur in the condenser microphone. Commercially available systems for measuring small changes in capacitance, as occur in a condenser microphone, generally fall into two broad categories: (1) systems using a polarization voltage, and (2) systems using a carrier frequency. In the polarization voltage systems a d.c. voltage, the polarization voltage, is applied between the diaphragm and fixed electrode of the condenser microphone. Motion of the diaphragm causes the condenser microphone to act as a charge generator. In the carrier frequency systems a high-frequency carrier voltage is applied to a tank circuit, consisting of the condenser microphone and a fixed inductor. Fluctuations in the microphone capacitance either modulate the carrier (AM or FM), or otherwise interact to produce an electric signal at the sound frequency. In a first of these carrier systems a double-tuned vacuum tube oscillator, producing a carrier frequency of 700 kHz, contains the condenser microphone in one of two coupled tank circuits. Motion of the microphone diaphragm instantaneously detunes one of the tank circuits to amplitude-modulate the carrier. In a second of these carrier systems, a 10 MHz carrier voltage is frequency-modulated by vibrations of the microphone diaphragm; the modulated signal is demodulated in an FM detector and the demodulated signal is fed into a preamplifier.

In addition to the commercially available carrier systems for measuring small capacitance changes mentioned above the following are described in the literature: R. Whiddington, Philosophical Magazine 40, page 634 (1920); W. Alexander, Electronic Engineering 23, page 479 (1951); H. Pursey and E. C. Pyatt, Journal of Scientific Instruments 31, page 248 (1954); F. V. Vernon, Journal of Scientific Instruments 35, page 28 (1958); and L. J. Rogers, Electronics 32, page 48 (Oct. 2, 1958).

In the Whiddington circuit two triode oscillators, one containing a reference capacitance and the other the variable capacitance, are coupled electrically such that variations in the variable capacitance produce an audible beat in a telephone receiver. In the Alexander circuit, the two triodes in Whiddington's circuit are replaced by an octode and the oscillator circuits are connected to different grids of the octode. The signals from the two oscillator circuits are mixed to produce a direct current proportional to the fluctuations in the variable capacitance. In the Pursey and Pyatt circuit a 60 MHz carrier voltage is frequency-modulated by fluctuations of a variable capacitance and the modulated signal is fed into an FM-AM converter, then demodulated in a diode detector. In the Vernon circuit a 70 MHz carrier voltage is frequency-modulated by fluctuations of a variable capacitance; the modulated signal is amplified and then demodulated in an FM discriminator. In the Rogers circuit a 7 MHz carrier voltage is applied across two tank circuits, one containing a reference capacitor and the other a variable capacitor in a differential arrangement; fluctuations in the variable capacitor amplitude-modulate the carrier.

The disadvantages of the commercially available systems using a polarization voltage are: the blocking capacitor between the microphone and preamplifier, needed to protect the latter against the high polarization voltage, limits the low-frequency response to several Hz. Thus these systems are confined to measurements of aircraft noise and are unsuitable for measurements of sonic boom, where frequency components in the sub-Hertz range are encountered. The systems are sensitive to cable length and generally require impedance matching networks at the termination of the cable. The application of a polarization voltage between the microphone electrodes enhances sensitivity to ambient humidity, especially if condensation takes place. The requirements of low noise floor, wide dynamic range, and wide frequency response cannot be met simultaneously.

The disadvantages of the commercially available systems using a carrier frequency are: because the first carrier system mentioned above uses a 1-inch microphone exclusively, it is restricted to measurement of frequencies less than about 10 kHz. This system is confined to sonic boom measurements, for in aircraft noise measurements an upper frequency limit of at least 20 kHz is desirable. Two difficulties inherent in this system are related to the fact that the carrier current travels the full length of the cable and is demodulated at the data acquisition station instead of at the microphone site. Adjacent cables containing slightly different carrier frequencies are susceptible to cross-modulation in the form of a beat between the two frequencies. The system is sensitive to cable length and type, and requires impedance-matching networks. In the second carrier system mentioned above, the cable capacitance restricts the distance between microphone and carrier electronics to a maximum of 10 meters. Thus, the latter must remain unattended if the microphone is located at a site of difficult accessibility. Furthermore, a source of 60 Hz power must be provided to the carrier electronics. Also the second carrier system has a high noise floor—72 dB rms in the band 2 Hz-20kHz with a ½-inch microphone.

The disadvantages of the noncommercial systems described in the literature are: the systems have been used exclusively in the laboratory for applications other than measurement of sound pressure levels. All these systems employ vacuum tube devices; there is no known report of attempts to design or construct equivalent systems with solid state devices. The compactness of the latter is essential in order to integrate the converter electronics and microphone cartridge in the same physical package.

It is therefore the primary purpose of the invention to provide circuitry that will produce an electric current proportional to the instantaneous sound pressure level at a condenser microphone, and be applicable to measurement of both aircraft noise and sonic boom.

SUMMARY OF THE INVENTION

The present invention evolved from Alexander's circuit in which the octode is the only active element. It is based upon the principle of the pentagrid converter, a circuit which finds extensive application in the field of commercial broadcasting. Three fundamental changes in the Alexander circuit are introduced. The octode is replaced by a dual-gate field-effect transistor (FET) in order that the converter circuitry be compact enough to be conveniently integrated with the microphone cartridge in the same physical package. The output stage is designed for compatability with specialized signal conditioning equipment. The pentagrid converter principle is adapted specifically for the measurement of the displacement of a condenser microphone diaphragm in a manner not possible with Alexander's circuit.

In this invention the converter produces an electric current proportional to the sound pressure level at a condenser microphone. The signal is transmitted over a cable typically 1,800 ft. in length, amplified by a current amplifier, and recorded on magnetic tape. The converter consists of a local oscillator, an FET mixer and a voltage regulator/impedance translator. The local oscillator generates a carrier voltage that is applied to one of the gates of the FET mixer. The FET mixes the microphone signal with the carrier to produce an electrical current at the frequency of vibrations of the microphone diaphragm. The voltage regulator/impedance translator regulates the voltage of the local oscillator and mixer stages, eliminates the carrier at the output, and provides a low output impedance at the cable terminals. The two circuits are combined into a single stage because of the intimacy of their circuit elements.

BRIEF DESCRIPTION OF THE DRAWINGS

FIG. 1 is a block diagram of the system incorporating the invention;

FIG. 2 is a schematic circuit diagram of the converter shown in FIG. 1;

DETAILED DESCRIPTION OF THE INVENTION

Figure 3:
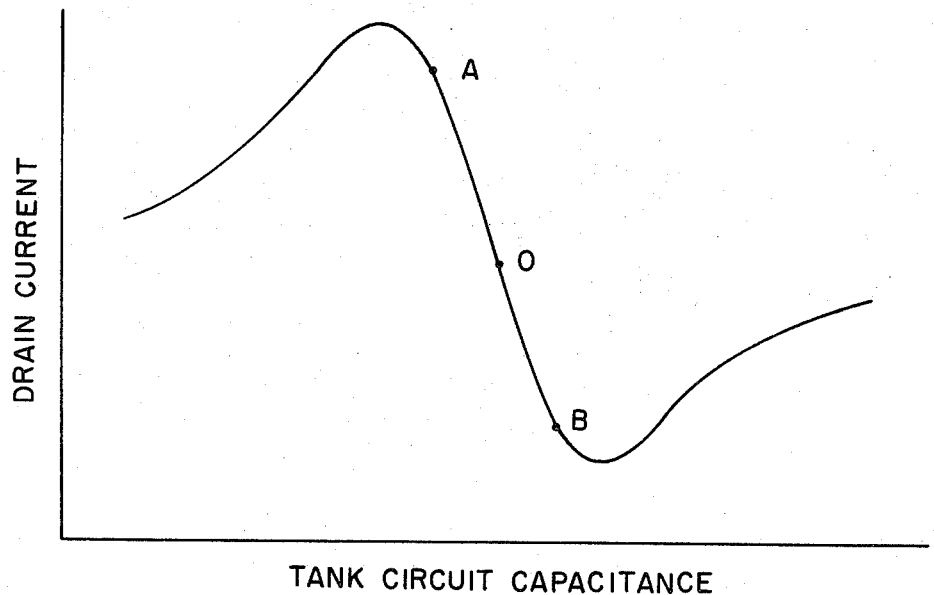
FIG. 3 is the transfer function of the converter in FIG. 2.

Turning now to the embodiment of the invention selected for illustration in the drawing the number 11 in FIG. 1 designates a condenser microphone. A converter 12, consisting of a local oscillator 13, an FET mixer 14 and a voltage regulator/impedance translator 15, produces an electric current proportional to the sound pressure level at the condenser microphone. The electric current is transmitted over a cable 16 typically 1,800 ft. in length, amplified by a zero drive current amplifier 17, and recorded on a magnetic tape recorder 18. The current amplifier 17 is an N400 Zero Drive Amplifier, manufactured by MB Electronics, Inc., New Haven, Conn.

The voltage regulator consists of a capacitor 21, a zener diode 22 and a ballast resistor 23 in FIG. 2. Capacitor 21 and zener diode 22 are connected between a terminal B (ground) and a point F, and resistor 23 is connected between point F and a terminal A. Across the ballast resistor 23, the voltage drops from 22V at terminal A to 10V at point F. The latter voltage is just equal to the zener voltage of zener diode 22. Because of the small base-emitter voltage drop of a transistor 24, this is for all practical purposes the power supply voltage at a point E for the local oscillator and mixer stages. Capacitor 21 enables currents at the carrier frequency to bypass the zener diode 22, and point E may be considered at ground potential as far as carrier currents are concerned.

The local oscillator consists of a transistor 25, a resistor 26, a capacitor 27, a resistor 28, a resistor 29 and a quartz crystal 30. Transistor 25 and resistor 26 are connected in series between point E and terminal B with their junction being a point C. Resistors 28 and 29 are connected in series between point E and terminal B with their junction being connected to the base of transistor 25, through capacitor 27 to point C and through crystal 30 to terminal B. Transistor 25 serves as the active element in a crystal-controlled Colpitts oscillator. Capacitor 27 serves as the base-emitter capacitor; interelectrode capacitive coupling fulfills the role of emitter-collector capacitor; and quartz crystal 30, operating between its series and parallel resonant modes, provides the base-collector reactance. The output of the oscillator, taken across resistor 26 at point C, has a magnitude of 4V peak-to-peak at a frequency of 9.008 MHz as determined by the quartz crystal. Resistors 28 and 29 form a voltage-divider network to bias the base of transistor 25. It is important that all elements of the local oscillator be well shielded from the remainder of the circuit, as indicated in FIG. 2, and that connections thereto be as short and direct as possible.

The FET mixer consists of capacitors 31 and 32, an inductor 33, a dual-gate FET 34, resistors 35, 36 and 37, and a capacitor 38. Capacitors 31 and 32, and inductor 33 are connected in parallel between gate $G_1$ of FET 34 and terminal B. The drain electrode D of FET 34 is connected through resistor 35 to point E, the source electrode S is connected to terminal B and the gate $G_2$ is connected to the junction of resistors 36 and 37. Capacitor 38 is connected between point C and gate $G_2$. Capacitor 38 couples the local oscillator output to gate $G_2$ of the FET and blocks the d.c. at point C. Resistors 36 and 37 form a voltage-divider network to bias gate $G_2$ of the FET at +2 V d.c., upon which the 4 V peak-to-peak carrier is superimposed. Consequently, in the course of a carrier cycle the gate $G_1$ transconductance, defined as the change in drain current per unit in gate $G_1$ voltage, varies typically from 1 to 12.5 mmho; such a strong dependence of the gate $G_1$ transconductance upon the gate $G_2$ voltage is characteristic of the dual-gate FET. Now capacitors 31 and 32 together with inductor 33 comprise a tank circuit connected between gate $G_1$ and source (ground): Capacitor 31 represents the condenser microphone (static capacitance ≈ 20 pf). Variable capacitor 32 is used to tune the tank circuit to the local oscillator frequency. Inductor 33 contains a high-Q torroidal core ($Q \approx 150$ at the carrier frequency). Resistor 35, the load resistor of the drain circuit, is chosen for optimal linear operation of the FET.

The carrier voltage at gate $G_2$ generates a component of drain current at the carrier frequency. As a result of drain-to-gate capacitive coupling a small fraction of the drain current leaks into the tank circuit and produces a voltage at gate $G_1$. The strong dependence of the gate $G_1$ transconductance upon the gate $G_2$ voltage causes the signal at gate $G_1$ to mix with that at gate $G_2$ and to generate a direct drain current component over and beyond the quiescent current. A change in capacitance 31 changes the level of this current; consequently, a periodic change in capacitance 31, as caused by the presence of sound at the microphone, produces a periodic FET drain current at the frequency of the sound. This component of the FET drain current will be called the "audio" current, even though in principle the frequency of such a current may extend from d.c. to several hundred kHz. The drain-to-gate capacitive coupling is an unwanted effect in a conventional mixer circuit, but here the effect is used to advantage and renders possible the detection of very small changes in capacitance 31.

FIG. 3 shows the dependence of the d.c. component of the FET drain current upon the tank circuit capacitance. The FET mixer operates within the region AB, the static operating point 0 lying approximately halfway between maximum and minimum values of drain current.

The impedance translator consists of transistor 24, a capacitor 39, a resistor 40, a Darlington transistor 41 and a resistor 42. Transistor 24 and resistor 40 are connected in series between terminal A and point E with the base of transistor 24 being connected to point F. Darlington transistor 41 and resistor 42 are connected in series between terminals A and B. The collector of transistor 24, point G, is connected to the base of transistor 41 and through capacitor 39 to terminal B. The carrier and audio components of FET drain current pass through the base-emitter terminals of transistor 24, causing sympathetic variations in the collector voltage at point G. The capacitance 39 is of such a magnitude as to short-circuit currents at the carrier frequency, but not those at audio frequencies. Capacitor 39 nominally maintains a voltage of 15 V d.c. at point G; this voltage rises and drops concomitantly with rises and drops in the audio component of the FET drain current. Now the current entering point A from the current amplifier, called the "line" current, splits at the node joining resistors 23, 40 and 42, part passing through each resistor. That part passing through resistor 42 enters the emitter of Darlington transistor 41. A small fraction of the emitter current exits the base and proceeds to point G; the remainder passes on to ground through the collector. The voltage drop across resistor 40 controls the base current of transistor 41, and this in turn controls the collector current. When the voltage at G rises or drops, these two parts of the line current drop or rise proportionally. Thus, the Darlington transistor 41 acts to lower the output impedance of the converter for better matching to the extremely low input impedance of the zero drive amplifier. The filtering action of capacitor 39 greatly attenuates the carrier current reaching the zero drive amplifier but has little effect upon the audio currents. The audio component of the line current is amplified by the zero drive amplifier 17 to drive magnetic tape recorder 18 or other such data acquisition device.

The circuit elements of converter 12, shown in FIG. 2, are housed in a brass tube, approximately three inches long and one inch in diameter. One end of the tube screws into a Bruel & Kjaer Type UAO300 Input Adapter, and the other end contains a standard BNC female connector to the cable. The microphone cartridge screws into the other end of the UAO300, which is modified in two ways: first, the guard ring is removed in order to reduce the capacitance in parallel with microphone capacitance 31, and second, the case is machined to seat the inductor 33 and variable capacitor 32.

The zero drive current amplifier 17 which is connected through cable 16 to the output terminals A and B of the converter 12 has two main functions. It amplifies the converter signal for recording on magnetic tape and it provides a constant 22 volts at terminals A and B. The advantages of the zero drive system is its insensitivity to cable length and type, and low triboelectric and other types of noise. Normally an intermediate device, a "line driver," is connected between the signal source and zero drive amplifier. By eliminating the line driver, the 22 volts on the line is used as the supply voltage for the converter without undermining the performance of the zero drive amplifier.

Circuit elements that can be used in the converter in FIG. 2 are: inductor 33, 12 uh, micrometals T30-7 core; Quartz crystal 30, RHA5A, Reeves-Hoffman 9.008 MHz; Zener diode 22, IN759A; Transistors 34, 25, 24 and 41 are 3N202 dual-gate FET 2N3711, 2N930 and S9120 Darlington, respectively; Capacitors 31, 32, 38, 27, 21 and 39 are 20 pf, 0.8–0.85 pf, 9 pf, 220 pf, 1.0 uf and 0.01 uf, respectively; resistors 35, 36, 37, 26, 28, 29, 23, 40 and 42 are all ¼ watt and are 330 ohms, 3.9 Mohms, 1.5M ohms, 5.1K ohms, 47K ohms, 47K ohms, 10K ohms, 806 ohms and 806 ohms, respectively.

Figure 5:
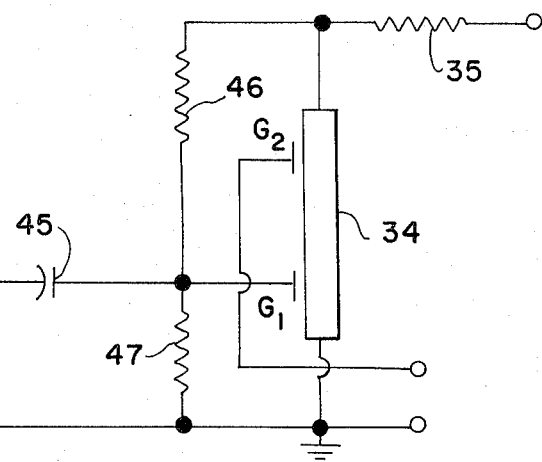
FIG. 5 is a network for biasing the dual-gate FET.
Figure 4:
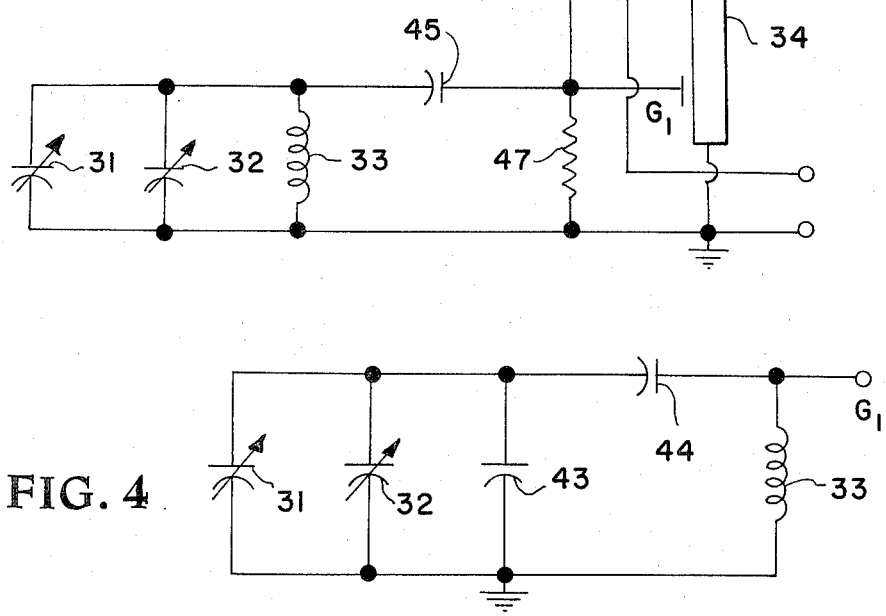
FIG. 4 is an alternate tank circuit with reduced sensitivity.

An alternate form of tank circuit, as shown in FIG. 4, provides for attenuation of the signal due to variation of the microphone capacitance 31 in order that the dynamic range of the converter may be shifted to higher sound pressure levels. The following values of the additional capacitors 43 and 44 make a desired attentuation factor F realizable and yet do not change the resonant frequency of the tank circuit: $C_{43}=(\sqrt{F}-1)(C_{31}+C_{32})$, $C_{44}=(\sqrt{F}/\sqrt{F-1})(C_{31}+C_{32})$. Capacitors 43 and 44 may be switched out of the tank circuit when the attenuation is not needed. An alternative to leaving gate $G_1$ of the FET unbiased is to introduce the bias network shown in FIG. 5. Resistors 46 and 47 form a voltage-divider network to bias gate $G_1$ slightly positive. Capacitor 45 prevents direct current from passing through inductor 33, but is large enough to have negligible influence upon the carrier current. If resistor 47 were replaced by a reverse-biased diode or a thermistor, the bias network would provide temperature compensation for the mixer circuit.

The local oscillator may be replaced by any form of oscillator circuit which will provide an output of 4V peak-to-peak at the carrier frequency, with or without crystal control. The Darlington transistor 41 may be replaced by a single gate FET, which will also provide a low output impedance at terminals AB.

The advantages of the invention over prior art are numerous. The specifications of the invention, with regard to noise floor, dynamic range, and frequency response, are of such latitude as to render it suitable for measurements of both aircraft noise and sonic boom. Prior carrier systems are not well suited for aircraft noise measurements because of either high noise floor or insufficiently high frequency response. Prior systems using a polarization voltage are unsuitable for sonic boom measurements because of insufficiently low frequency response. The microphone cartridge and carrier electronics are integrated in the same physical package. This feature eliminates the need for the carrier to travel over an interconnecting cable, as in the case in prior carrier systems, as well as the associate problems, such as excessive capacitive loading of the microphone, cross-talk between adjacent units, and sensitivity of the tuning to cable length. The invention avails itself of the advantages of the "zero drive" principle recently developed by MB Electronics, Inc. This feature not only reduces the noise generated in the cable between the converter and data acquisition station, but also allows arbitrary lengths of cable, up to several thousand feet, to be used without impedance matching networks. Additional advantages include ruggedness, endurance, small size, light weight and low power requirements.

What is claimed as new and desired to be secured by Letters Patent of the United States is:

1. Instrumentation for measuring aircraft and sonic boom comprising:
    a condenser microphone means for varying a capacitor in accordance with the noise picked up by said microphone means;
    an oscillator for generating a carrier frequency;
    a tank circuit including said capacitor tuned to said carrier frequency;
    a field-effect transistor means connected to receive the outputs from said oscillator and said tank circuit for producing an electrical signal containing said carrier frequency and the variations of said capacitor; and
    means for removing said carrier frequency from said electrical signal to obtain an electric current that is proportional to the sound pressure at the microphone.

2. Instrumentation according to claim 1 wherein said field-effect transistor means includes first and second gates with said tank circuit connected to the first gate and with said oscillator connected to the second gate.

3. Instrumentation according to claim 1 including means for regulating the voltage of said oscillator and said field-effect transistor means.

4. Instrumentation according to claim 1 including a zero drive current amplifier having an extremely low input impedance and a cable connecting said electric current that is proportional to the sound pressure at the microphone, to the input of said zero drive current amplifier.

5. Instrumentation according to claim 4 including means for lowering the output impedance of said instrumentation to better match the input impedance to the zero drive current amplifier.

6. Instrumentation according to claim 5 wherein said means for lowering the output impedance of said instrumentation includes a Darlington transistor.

* * * * *